P. MOLITOR & M. RENKERT.
Farm-Gates.

No. 153,363.  Patented July 21, 1874.

WITNESSES.
F. H. Schott.
C. L. Evert.

INVENTOR
Peter Molitor.
Mathias Renkert.
By Alexander Amador
Attorneys.

UNITED STATES PATENT OFFICE.

PETER MOLITOR AND MATTHIAS RENKERT, OF SHERRILL'S MOUNT, IOWA.

IMPROVEMENT IN FARM-GATES.

Specification forming part of Letters Patent No. 153,363, dated July 21, 1874; application filed May 29, 1874.

*To all whom it may concern:*

Be it known that we, PETER MOLITOR and MATTHIAS RENKERT, of Sherrill's Mount, in the county of Dubuque and in the State of Iowa, have invented certain new and useful Improvements in Gates; and do hereby declare that the following is a full, clear, and exact description thereof, reference being had to the accompanying drawings and to the letters of reference marked thereon, making a part of this specification.

The nature of our invention consists in a mode of constructing and elevating gates, the peculiarities of which will be hereinafter described.

In the annexed drawings, which represent a side and front view of our gate, A represents the gate itself, which may be made in any of the known and usual ways. This gate is firmly secured at its top to one end of two levers, B, B. A brace, D, passes from the bottom of the gate to a point near the fulcrums of the levers, in order to keep it securely in position. C C represent the gate-posts, and B B two levers, said levers being secured to the gate at one end, and having their fulcrums in the posts C C. These levers have pivoted fulcrums, upon which they turn or partially revolve. E represents weights, which are placed and secured upon the outer ends of the levers, and are for the purpose of counterbalancing the gate.

Figure 1:
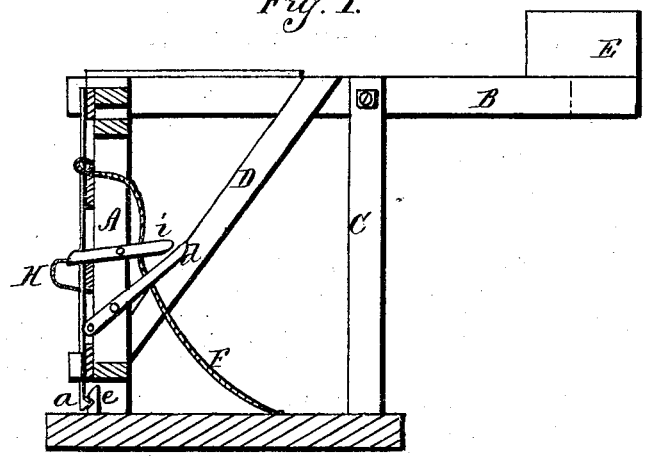
Figure 2:
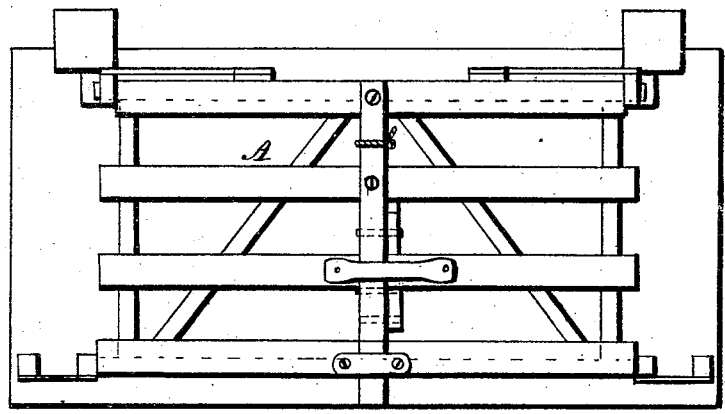

When the gate is closed, as seen in Fig. 1, a latch, *a*, catches into a notched post, *e*, which is planted in the ground about the center of the gate. A lever, *d*, operates upon the latch *a*, on one side of the gate, and frees it, while a lever, *i*, may be used upon the other side of the gate for the same purpose. The moment the latch *a* is freed from the post *e* the weights E, being a little heavier than the gate, fall toward the ground, and thus elevate the gate, causing it to make a quarter-revolution, and stand over the gate-posts, opening, or a gateway.

A cord, F, may be used for drawing the gate down again, so as to latch it, and thus close the gateway.

A bow or shield, H, may be used to protect the lever *i*, to keep cattle from tampering with the latch.

We are aware that a gate with its two end pieces extended and weighted, and which are pivoted between the gate-posts, so that the gate may revolve and be suspended directly above its normal position, with its top downward, is not new. To open said gate it must make a half-circle. To open our gate, it makes a quarter-circle. With our construction the gate is firmly braced, and not easily gotten out of repair, and, furthermore, our gate opens and closes as fast again as the kind above referred to.

Having thus fully described our invention, what we claim as new, and desire to secure by Letters Patent, is—

The gate A, secured by braces D at right angles to, and near the ends of, the pivoted and weighted levers B, and provided with a spring-latch to engage with the latch E, all substantially as set forth.

In testimony that we claim the foregoing we have hereunto set our hands this 4th day of May, 1874.

PETER MOLITOR.
MATTHIAS RENKERT.

Witnesses:
EDWARD FRIES,
GEORGE WITTER.